United States Patent [19]
Duran

[11] Patent Number: 5,702,214
[45] Date of Patent: Dec. 30, 1997

[54] NON-REMOVABLE STRUCTURAL FASTENER ASSEMBLY

[75] Inventor: John A. Duran, Glendora, Calif.

[73] Assignee: Avibank Mfg., Inc., Burbank, Calif.

[21] Appl. No.: 746,235

[22] Filed: Nov. 7, 1996

[51] Int. Cl.$^6$ .............................. F16B 31/00; F16B 13/04
[52] U.S. Cl. ................................... 411/5; 411/24; 411/55
[58] Field of Search .......................... 411/3–5, 24, 26, 411/27, 32, 33, 55, 60, 61, 62, 383, 384

[56] References Cited

U.S. PATENT DOCUMENTS

| | | | |
|---|---|---|---|
| 1,513,669 | 10/1924 | Nicewarner et al. | 411/24 |
| 2,940,495 | 6/1960 | Wing . | |
| 3,138,987 | 6/1964 | Wing . | |
| 4,078,471 | 3/1978 | Archibald et al. | 411/24 |
| 4,457,642 | 7/1984 | Pratt | 411/38 |
| 4,747,202 | 5/1988 | Beals | 29/437 |
| 5,224,806 | 7/1993 | Duran | 411/33 |
| 5,284,408 | 2/1994 | Duran et al. | 411/55 |
| 5,517,742 | 5/1996 | Mann | 29/456 |

OTHER PUBLICATIONS

Huck Lightweight GP Lockbolt Fastener; ©1982.
Monogram Aerospace Fasteners Brochure ©1992 Entitled *True Hole Filling Blind Fastener*.

*Primary Examiner*—Neill R. Wilson
*Attorney, Agent, or Firm*—Oppenheimer Poms Smith

[57] ABSTRACT

A fastener assembly for permanently securing together a pair of mating panels having aligned apertures therethrough including a bolt having an enlarged head at one end, a threaded shaft portion at the other end and an integral main body portion interconnecting the head and the shaft portion, a split ring bushing encircling the bolt, a first nut threadably mounted on the bolt having deformable protrusions thereon and a second nut threadably mounted on first nut also having first deformable protrusions thereon, both sets of protrusions being deformable at a predetermined load thereon into the threads of the bolt and the first nut respectively, the first nut being forced against the bushing when threaded on the bolt and the second nut abutting against an underside of one of the panels when threaded on the first nut thereby providing a mechanical lock between the deformed protrusions and the mating threads permanently locking the panels together. In a second embodiment, a first nut is mounted inside of a second nut, the latter being threaded onto the bolt and the first nut abutting against the bushing.

46 Claims, 12 Drawing Sheets

NON-REMOVABLE STRUCTURAL FASTENER ASSEMBLY

BACKGROUND OF THE INVENTION

1. Field of the Invention

The invention relates to fastener assemblies; and, more particularly, to non-removable structural fastener assemblies for aircraft panels or the like.

2. Description of Pertinent Art

Fasteners are used in a variety of applications, wherein, surfaces being connected together impose unique stringent requirements for which the fastener must be particularly adapted.

The application in which rivets or structural fasteners are used in the construction of aero-dynamic designs, aircraft and the like, impose some of the most stringent requirements. In particular, the fasteners must secure the members but resist losing their gripping power under the stresses and vibrations imposed upon them by the harsh environment in which they are used.

In assembling such panels to the aircraft structure, alignment problems may occur where the panels are to be affixed to the aircraft body. Thus the holes in such panels are in the aircraft body must be held to very close manufacturing tolerances to ensure maximum load transfer between the panels and the aircraft.

It has been discovered that, because oversized holes continue to exist on the sub-structure, the sub-structure may prematurely develop cracks in the aluminum body surrounding such holes and prematurely fail. Therefore, since aircrafts are normally warranted by the aircraft manufacturer for a predetermined number of flight hours, such premature cracking in the panel body failure is a serious problem. Over the years, aircraft manufacturers have sought various solutions to this problem, such as line hole drilling the panels and body substructure. This is a very time consuming and expensive operation. However, this will ensure proper fit, and in some cases, an interference fit of the fastener onto the application.

There does exist a need for a fastener assembly that can fill the application hole completely and eliminate the necessity of drilling close tolerance holes to ensure load transfer. Basically, there is a need for a fastener that can grow in diameter and completely fill the hole, thereby, eliminating premature failures of the aircraft.

SUMMARY OF THE INVENTION

It is an object of this invention to provide apparatus for permanently attaching two aircraft panels together wherein holes in the mating panels may be misaligned.

It is an object of this invention to carry out the foregoing object wherein the holes in the mating panels are completely filled by the apparatus.

These and other objects are preferably accomplished by a bolt adapted to be mounted in aligned holes in mating panels having an enlarged head at one end, a threaded shaft portion at the other end and an integral main body portion interconnecting the head and the shaft portion, a split ring bushing encircling the bolt, a first nut threadably mounted on the bolt having deformable protrusions thereon and a second nut threadably mounted on first nut also having deformable protrusions thereon, both sets of protrusions being deformable at a predetermined load thereon into the threads of the bolt and the first nut respectively, the first nut being forced against the bushing when threaded on the bolt and the second nut abutting against an underside of one of the panels when threaded on the first nut thereby providing a mechanical lock between the deformed protrusions and the mating threads permanently locking the panels together.

In a second embodiment, a first nut is mounted inside of a second nut, the latter being threaded onto the bolt and the first nut abutting against the bushing. In a third embodiment, the bushing is threaded on its interior.

DESCRIPTION OF THE PREFERRED EMBODIMENTS

Figure 1:
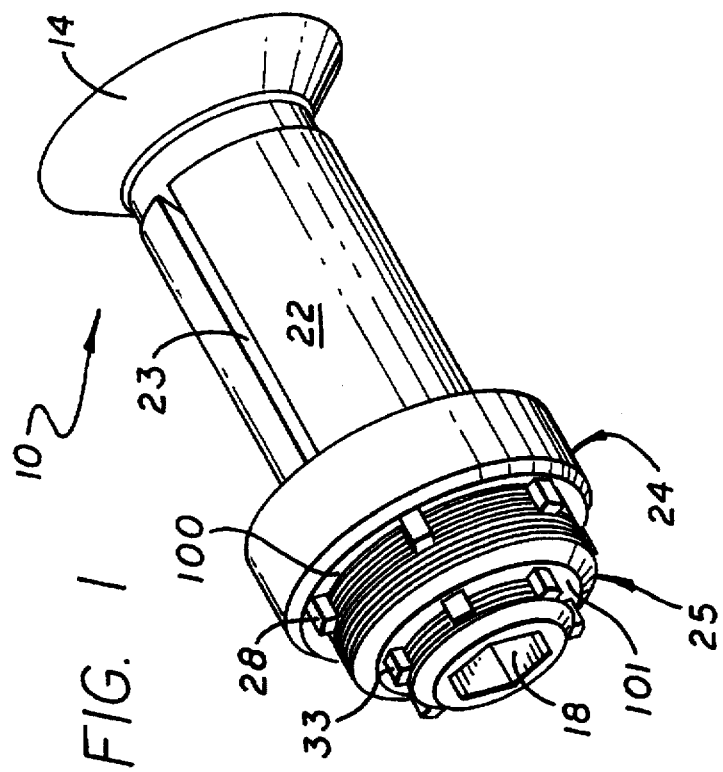
FIG. 1 is a perspective view of a fastener in accordance with the teachings of the invention.
Figure 2:
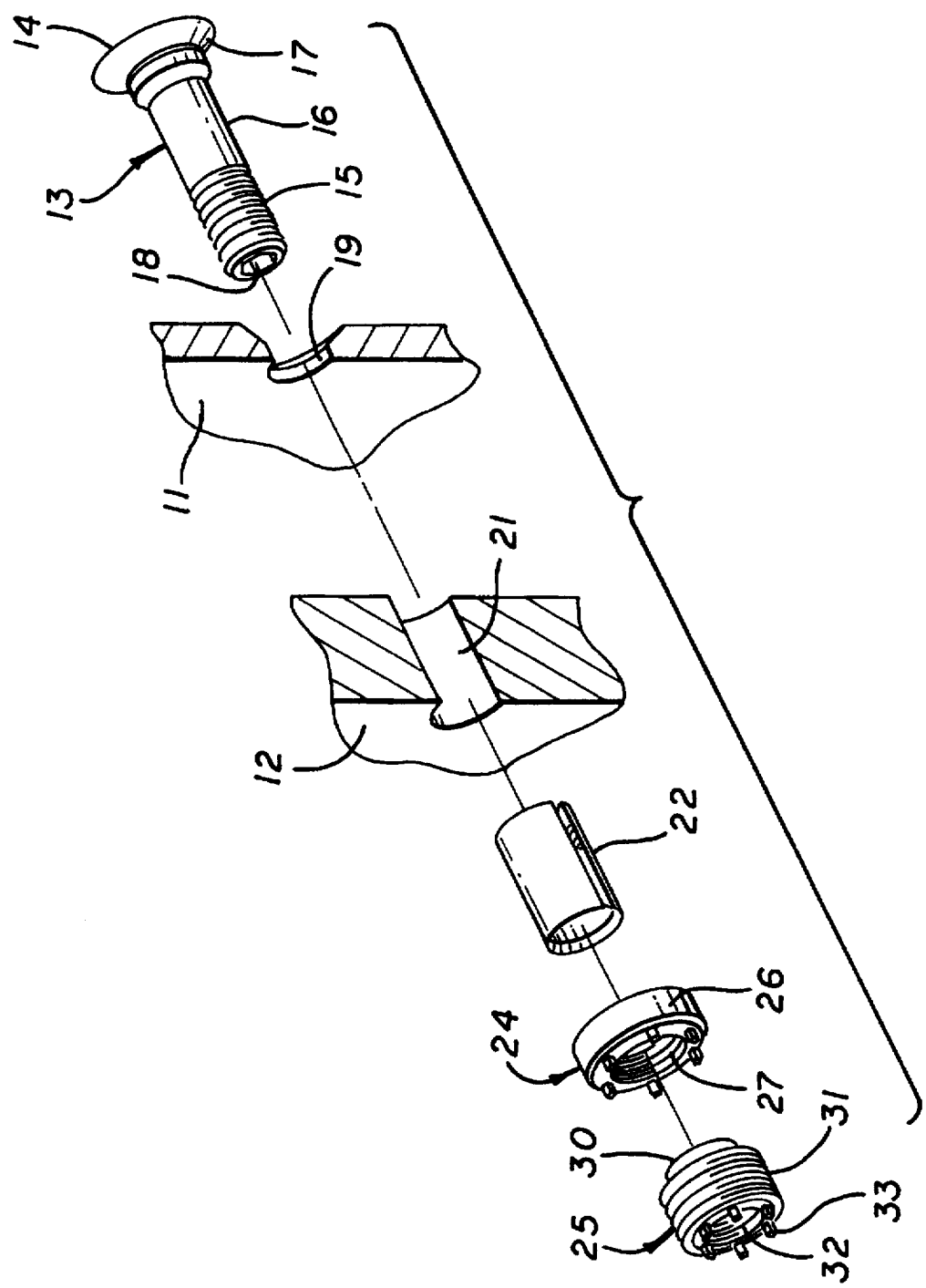
FIG. 2 is an exploded view of the fastener of FIG. 1 showing a pair of panels in which the fastener is to be installed.

Referring now to FIG. 1 of the drawing, a fastener assembly 10 is shown adapted to permanently secure together a pair of mating panels 11, 12 (FIG. 2).

Assembly 10 includes a bolt 13 having an enlarged head 14 at one end and a threaded shaft portion 15 at the other end interconnected by an integral main body portion 16. Head 14 may be tapered on the underside 17 thereof where it joins cylindrical portion 34 (FIG. 4) coupled to tapered portion 35 leading to main body portion 16. A hex socket 18 may be provided in the terminal end of threaded shaft portion 15 for reasons to be discussed.

Panel 11 is the main outer panel, which may be an aircraft outer skin or the like, and has a hole 19 therethrough countersunk at countersink 20. Panel 11 is adapted to abut against inside panel 12 which panel 12 has a hole 21 therethrough. Hole 21 is generally aligned with hole 19 (but, as heretofore discussed, may be slightly misaligned).

Assembly 10 includes a cylindrical hollow bushing 22 (FIG. 2) having an elongated slit 23 (FIG. 3) therethrough. Finally, assembly 10 includes an outer nut 24 and an inner nut 25 (see also FIG. 2).

Outer nut 24 has a generally cylindrical main body portion 26 and an inner threaded throughbore 27. As particularly seen in FIG. 3, a plurality of spaced protrusions 28 extend downwardly and away from the forward face 100 (FIG. 1) of main body portion 26.

Inner nut 25 has a first generally cylindrical portion 30 (FIG. 2) integral with a main body portion 31 (of greater outer diameter than portion 30 and threaded on the exterior). Nut 25 has a threaded interior 32 and a plurality of spaced protrusions 33 extending from the forward face 101 (FIG. 1) of main body portion 31.

Figure 4:
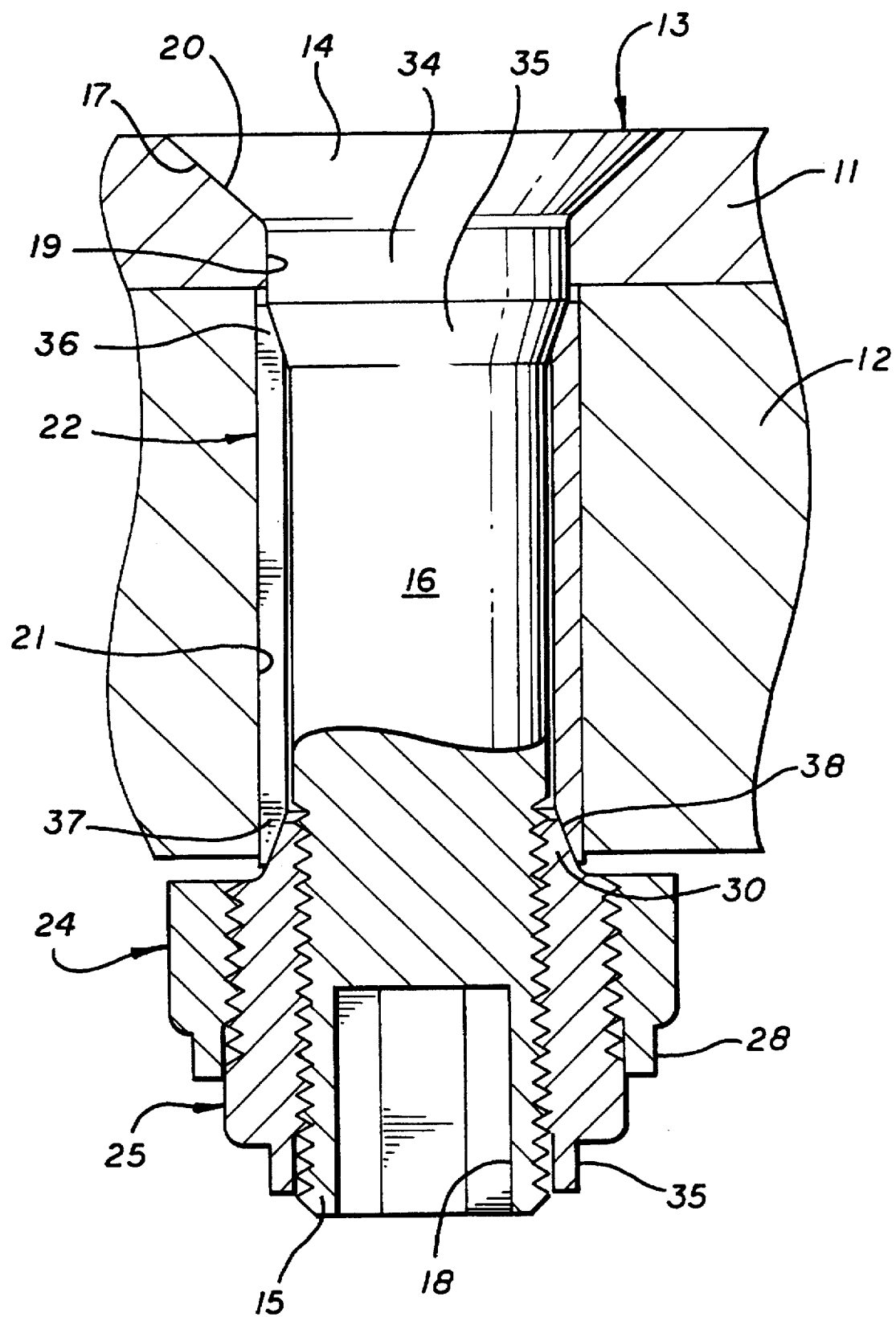
FIG. 4 is an elevational view, partly in section, of the assembly of FIG. 3 prior to tightening of the nuts of the fastener.

In operation, bolt 13 is inserted through aligned holes 19, 21 in panels 11, 12 until the tapered underside 17 of head 14 rests in countersink 20 in panel 11 (FIG. 4). Cylindrical portion 34 fits in hole 19 in panel 11. Bushing 22 is tapered on its interior at upper and lower tapered ends 36, 37, respectively. Thus, the tapered portion 35 of bolt 13 conforms to upper tapered end 36. Bushing 22 surrounds main body portion 16 of bolt 13 and may be secured in position thereon (yet still expand to fill hole 21 as will be discussed).

Outer nut 24 is threaded on inner nut 25 as seen in FIG. 4.

Figure 5:
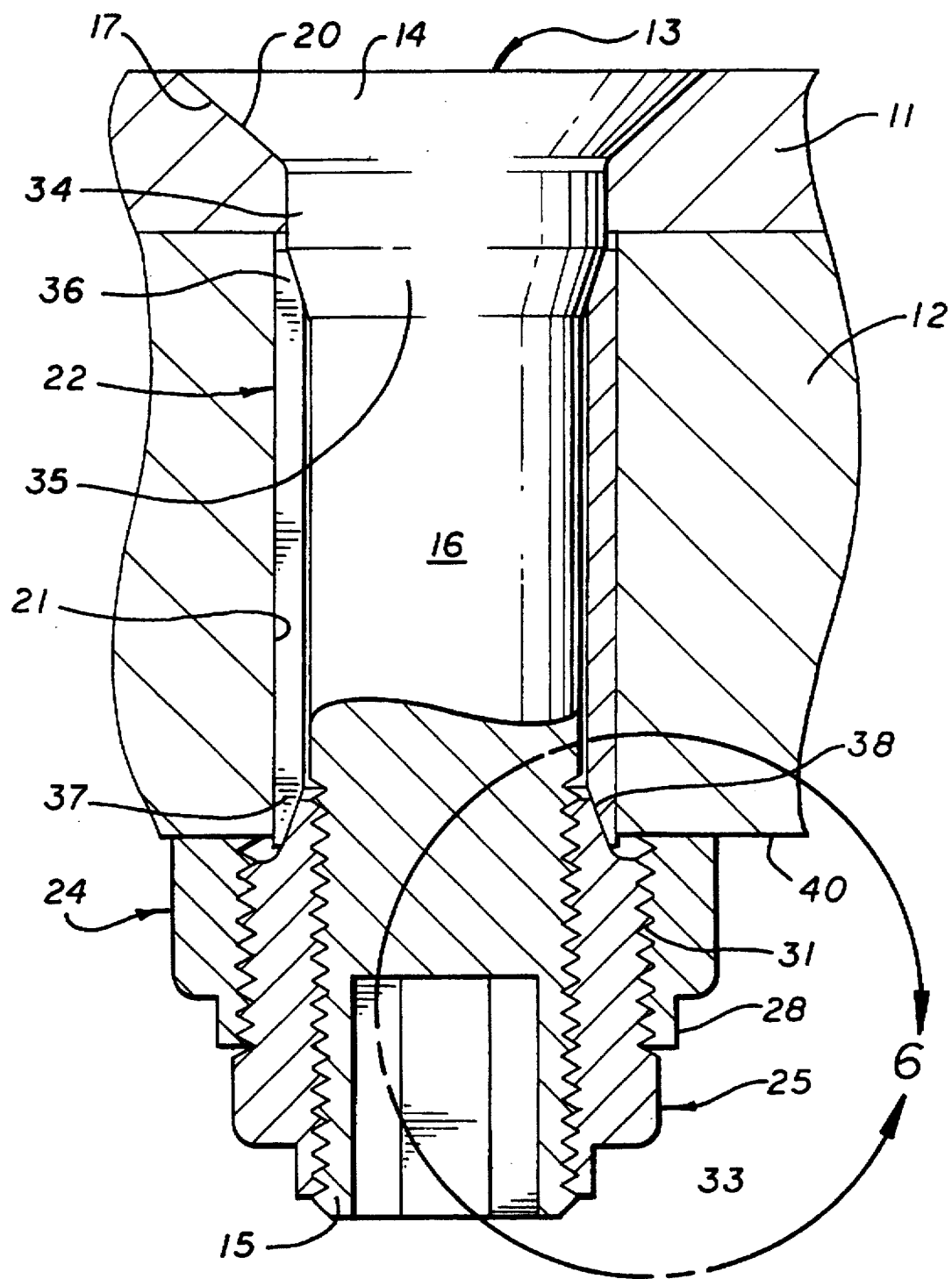
FIG. 5 is an elevational view similar to the view of FIG. 4 illustrating the final steps in tightening of the nuts of the fastener.

Inner nut 25 is now threaded onto threaded end 15 of bolt 13, the upper end of portion 30 being tapered on the exterior at taper 38 thereby conforming to tapered end 37 of bushing 22. This threading may be accomplished in any suitable manner, even manually. However, preferably, a hex tool (not shown) is inserted into hex socket 18 holding bolt 13 in position while nut 25 is rotated in the direction of arrow 39 in FIG. 3. Rotation of nut 25 on threaded shank portion 15 of bolt 13 while holding bolt 13 allows the tapered end 38 to abut against end 37 of bushing 22 expanding the split bushing 22 radially outwardly expanding the same within hole 21. This provides for complete fill of the hole 21. Such rotation of nut 25 and radial expansion of bushing 22 is carried out until a predetermined torque is reached between nut 25 and threaded end 15. At this predetermined torque, protrusions 33 deform into the threads of threaded end 15 as seen in FIG. 5 thus mechanically locking the same to the threads of threaded end 15. This provides for a mechanical lock at the proper torque and prevents nut 25 from backing off under severe vibration.

Figure 3:
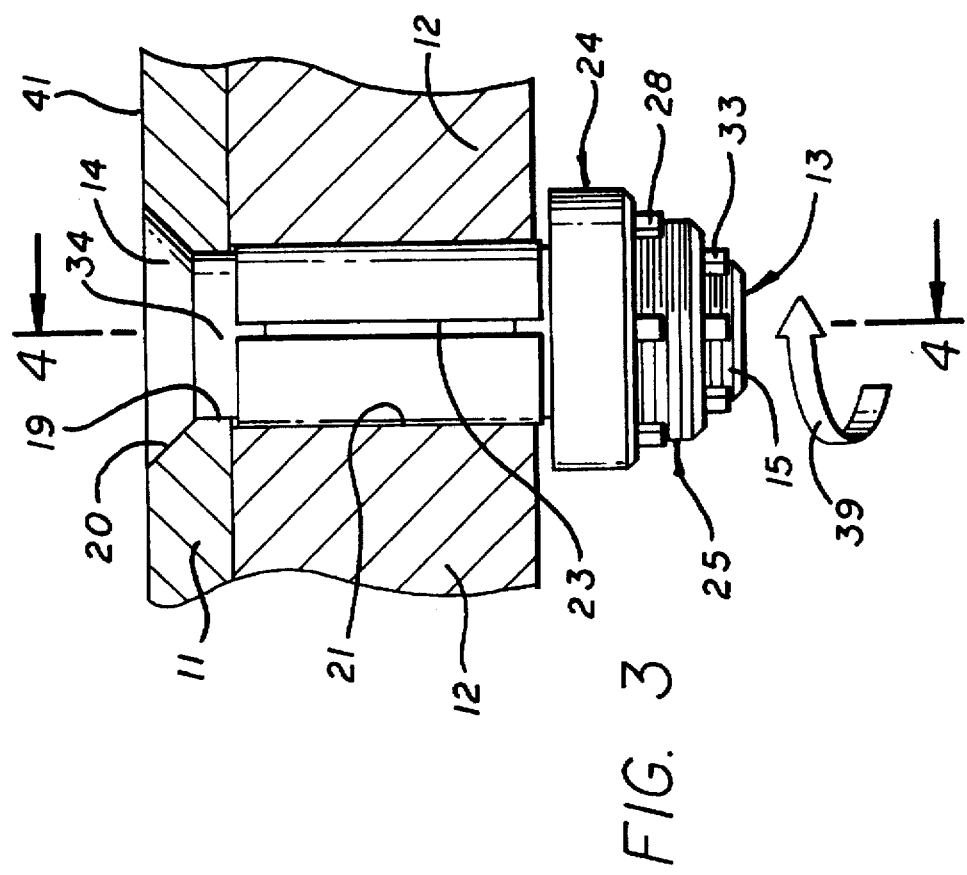
FIG. 3 is an elevational view, partly in section, of the fastener of FIGS. 1 and 2 assembled to the panels of FIG. 2.

As seen in FIG. 3, at this stage of the assembly, there is a gap between panel 12 and nut 24. Thus, there is of yet no clamp up of the panels 11 and 12. Tapered portions 38, 37 insure proper placement of bushing 22.

Figure 6:
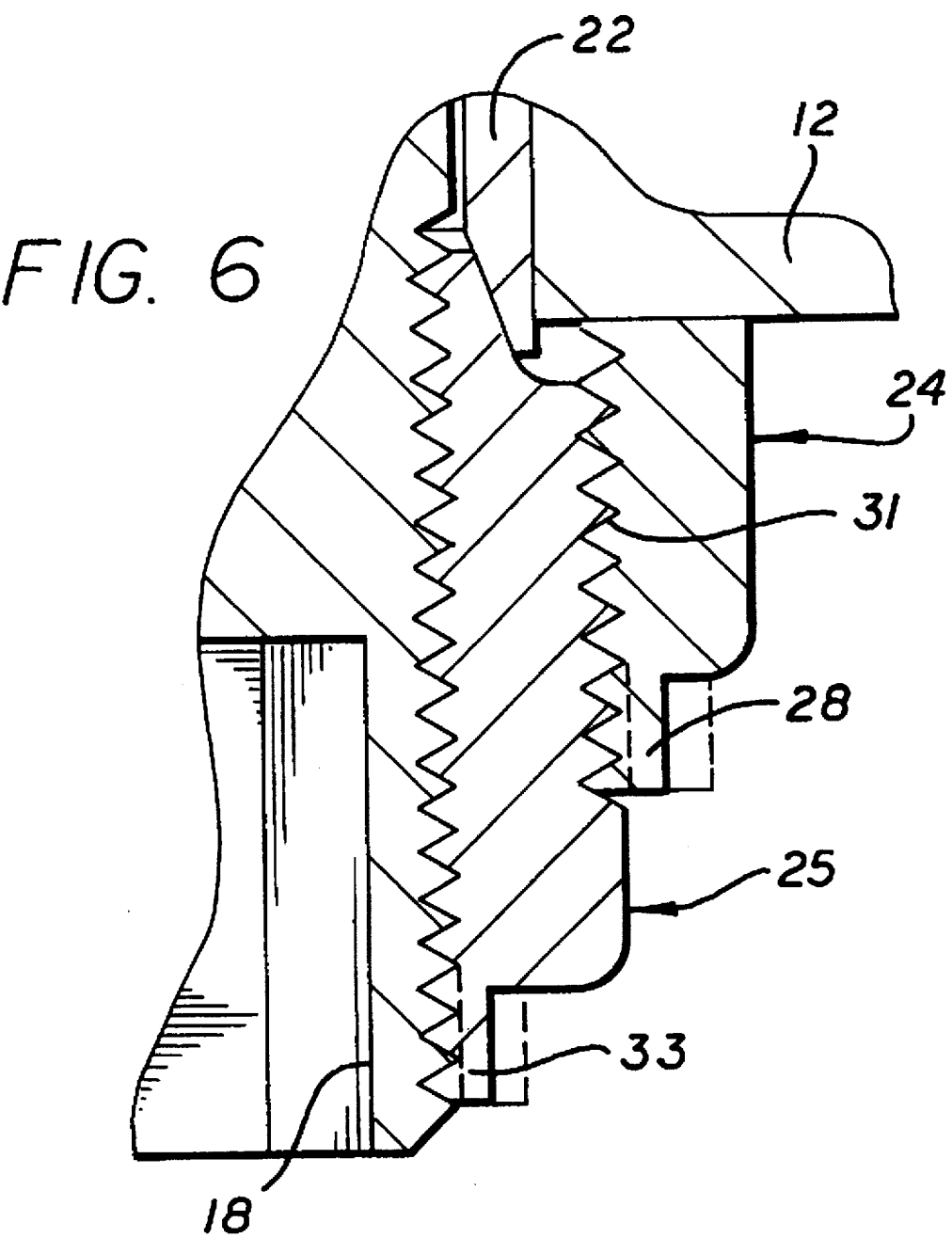
FIG. 6 is a detailed view along line 6 of FIG. 5 illustrating deformation of the nuts and threads of the fastener of FIGS. 1 to 5.

Nut 24 is now rotated until a predetermined torque is reached between protrusions 28 and threads 31 and nut 24 abuts against the underside 40 of panel 12 thereby bottoming out against panel 12 as seen in FIG. 5. As the nut (24) continues to rotate, it applies an axial clamp-up force onto the panel (12) and panel (11) against the head or underside (17) of the bolt (13). When this predetermined torque is reached, protrusions 28 deform into threads 31 as seen in FIG. 5 and as further indicated by the dotted lines in FIG. 6. This deformation indicates that the assembly 10 is properly set in panels 11, 12 and head 14 of bolt 13 is flush with the outer surface 41 (FIG. 3) of the exterior panel 11.

Any suitable installation tools may be used, such as a hex tool inserted in socket 18. Any suitable tool may be used to rotate nuts 24, 25, such as conventional wrenches. Although socket 18 is disclosed as hex-shaped, it may be of any suitable configuration.

Although bushing 22 is shown as a separate part in FIG. 2, it may be preassembled to bolt 13, as, for example, by providing parts that mate on portion 16 and the interior of bushing 22.

Figure 7:
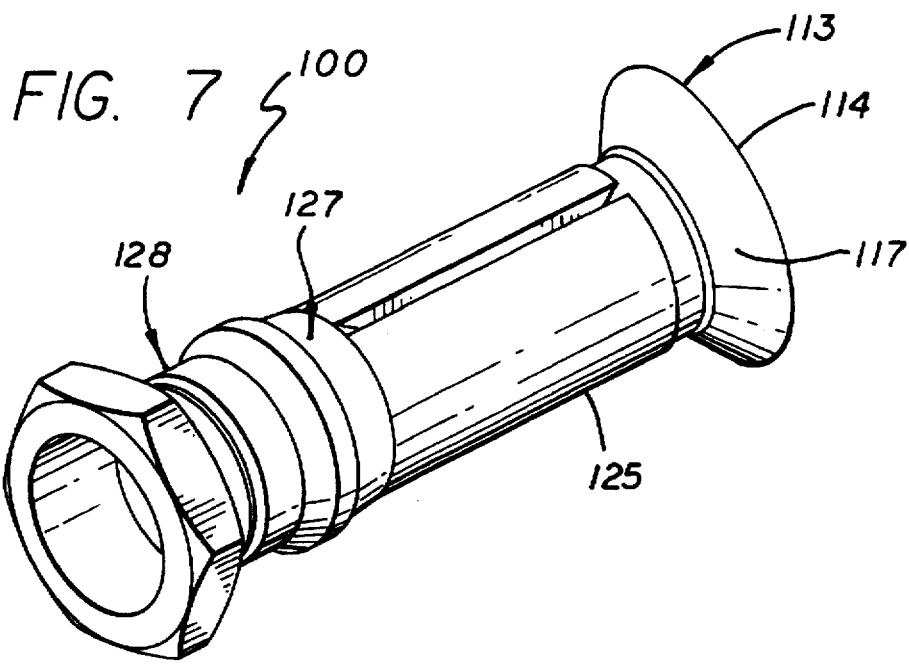
FIG. 7 is a perspective view of a second embodiment of a fastener in accordance with the teachings of the invention.
Figure 8:
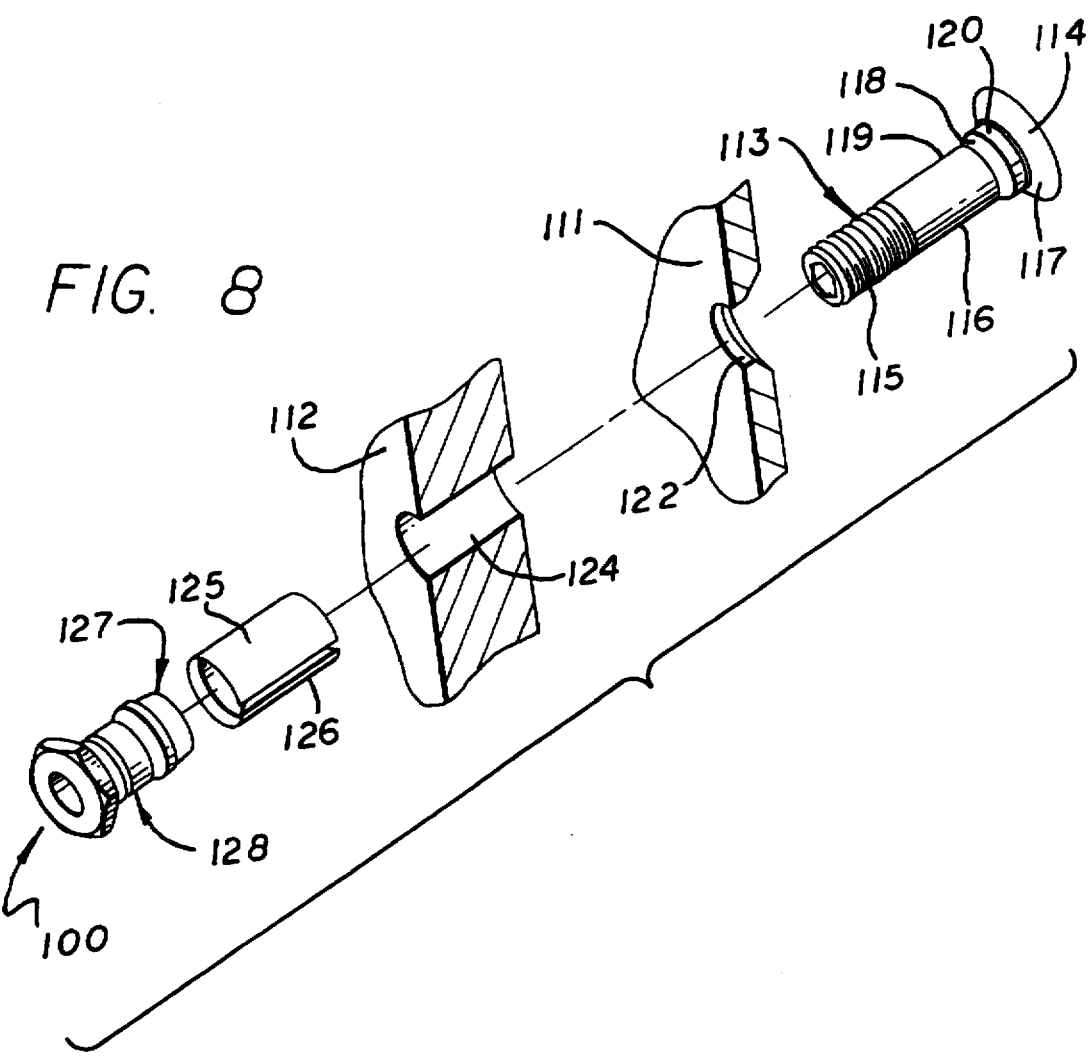
FIG. 8 is an exploded view of the fastener of FIG. 7 showing a pair of panels in which the fastener is to be installed.

Referring now to FIG. 7, a second embodiment of the invention is shown. Fastener assembly 100 is adapted to permanently secure together mating panels 111, 112 (FIG. 8). Assembly 100 includes a bolt 113 having an enlarged head 114 at one end and a threaded shaft portion 115 at the other end interconnected by an integral main body portion 116. Head 114 may be tapered on the underside 117 thereof where it joins cylindrical portion 120 of main body portion 116. Cylindrical portion 120 leads to a tapered portion 118 leading to a second cylindrical portion 119 of main body portion 116, of smaller diameter than portion 120. Cylindrical portion 119 extends to threaded portion 115. A hex-sided star shaped cavity 121 may be provided in the terminal end of threaded shaft portion 115 for reasons to be discussed. Cavity 121 may be hex-shaped, or any other suitable irregularly shaped configuration for receiving a like configured tool therein, if desired.

Figure 9:
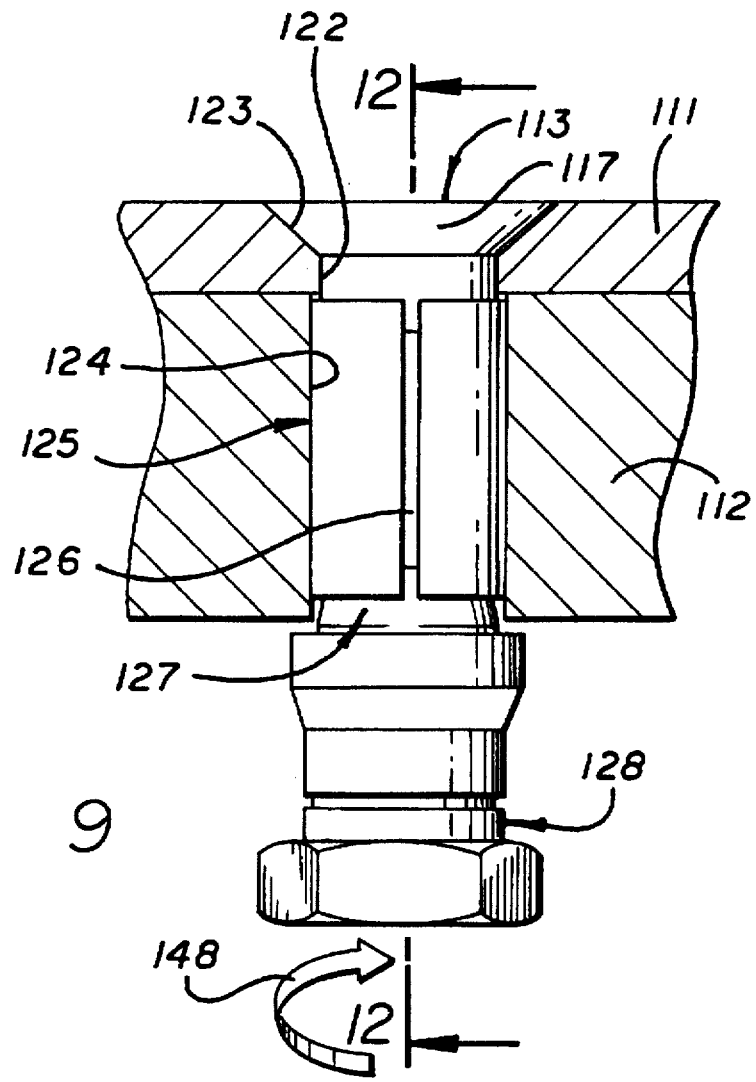
FIG. 9 is an elevational view, partly in section, of the fastener of FIGS. 7 and 8 assembled to the panels of FIG. 8.

Panel 111 is the main outer panel, similar to panel 11, and has a hole 122 therethrough, which may be countersunk at countersink 123 (FIG. 9). Panel 111 is adapted to abut against panel 112, similar to panel 12, which panel 112 has a hole 124 therethrough. Hole 124 is generally aligned with hole 122 when the panels abut but may be slightly misaligned as heretofore discussed.

Assembly 100 includes a cylindrical hollow bushing 125 (FIG. 8) having an elongated slit 126 therethrough. Assembly 100 also includes an inner nut 127 and an outer nut 128.

Figure 10:
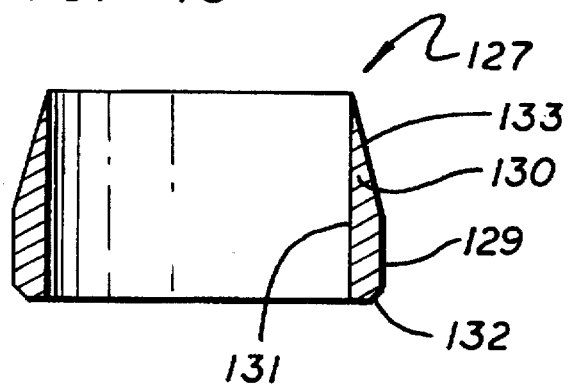
FIG. 10 is an elevational sectional view of one of the components of the fastener of FIGS. 7 and 8.

Inner nut 127 is shown in FIG. 10 and includes a generally cylindrical main body portion 129 and an integral outwardly tapered portion 130 defining a generally cylindrical inner through bore 131. The outer peripheral edge of main body portion 129 may be chamfered as at chamfer 132. The opposite end 133 tapers to a point as shown.

Figure 11:
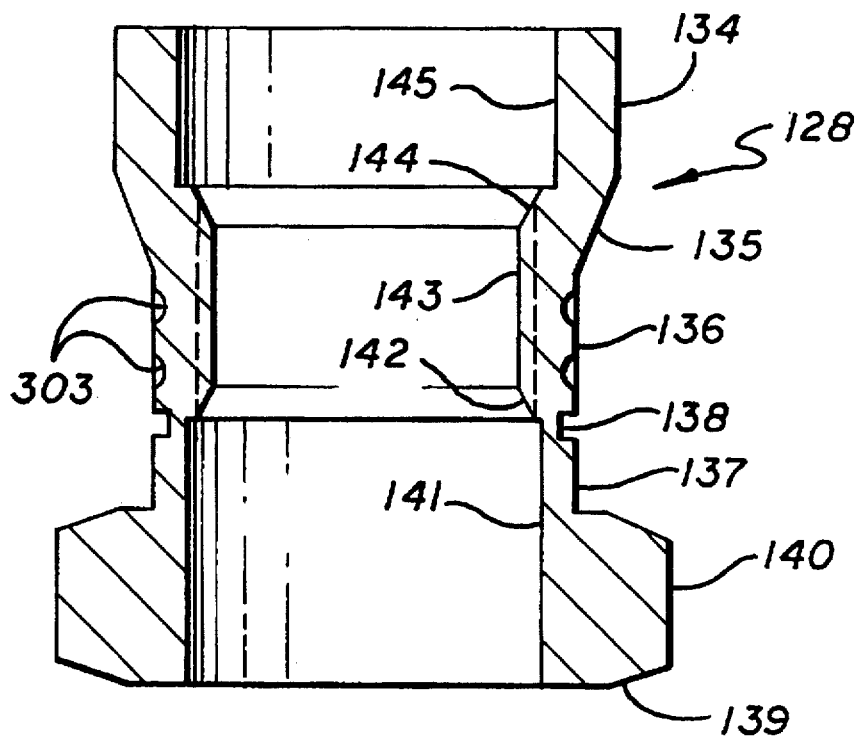
FIG. 11 is an elevational sectional view of another component of the fastener of FIGS. 7 and 8.

Outer nut 128 (see particularly FIG. 11) has a first generally cylindrical body portion 134, and an integral tapered portion 135 leading to an integral second generally cylindrical portion 136. Portion 136 is of lesser outer diameter than portion 134 and is separated from a third cylindrical portion 137 of generally the same outer diameter by a breakgroove 138 of lesser outer diameter. Portion 137 is integral with a terminal nut portion 139 having flats 140 (such as forming a hex-shape) for gripping the same by a suitable tool (not shown). A generally cylindrical throughbore 141 extends through nut portion 140, cylindrical portion 137 and breakgroove 138 communicating with a tapered opening 142 leading into a threaded throughbore 143. The threads of throughbore 143 mate with the threaded portion 115 of bolt 113. Throughbore 143 communicates with a tapered opening 144 leading into throughbore 145 in cylindrical portion 134. A passageway is thus provided through nut 128 as seen in FIG. 11.

Inner nut 127 is shown as smooth bored internally in FIG. 10. The outer diameter of cylindrical portion 129 is generally related to the inner diameter of throughbore 145 so that portion 129 may be press fit therein as seen in FIG. 9. Thus, nuts 127 and 128 may be preassembled with an interference fit between the two nuts. Alternatively, other means may be provided for securing first nut 127 inside of second nut 128, such as by mating threads, adhesive bonding, etc., as long as the first nut 127 is adapted to break off from second nut 128 when a predetermined torque is overcome as will be discussed.

A plurality of small depressions 303 or impressions may be provided around the outside of nuts 128 creating slight distortion of the internal threads thereof thereby creating a self-locking feature when mated with the bolt. That is, such thread distortion creates a mechanical lock between the bolt and nut 128. This thread distortion is accomplished prior to assembly of the nuts onto the bolt and ensures the inner nut and/or outer nut remain in the correct installed position after the inner and outer nuts have been properly assembled.

Also, as heretofore discussed with respect to bolt 13 and bushing 22, bushing 125 may be preassembled on bolt 113 as seen in FIG. 9 and retained thereon trapped about portion 119, and generally the same length, in any suitable manner, such as snapping into undercut portion 119.

In operation, bolt 113, having bushing 125 disposed thereon, is inserted through aligned holes 122, 124 in panels 111, 112 until the tapered underside 117 of head 114 rests in countersink 123 in panel 111 (FIG. 9). Cylindrical portion 116 is disposed in hole 122. Bushing 125 is tapered on its interior at upper and lower tapered ends 146, 147, respectively (see FIG. 12). Thus, the tapered portion 118 of bolt 113 conforms to upper tapered end 146 of bushing 125 and the upper end 133 of nut 127 conforms to the lower tapered end 147 of bushing 125. Bushing 125 thus surrounds main body portion 119 of bolt 113 and may be secured in position therein (yet still expand to fill hole 124 as will be discussed).

Nut 128 is now threaded onto threaded end 115 of bolt 113, the tapered upper end 133 of nut 127 conforming to tapered end 147 of bushing 125. This threading may be accomplished in any suitable manner, even manually. However, preferably, a tool (not shown) conforming to socket 121 is inserted therein holding bolt 113 in position while nut portion 139 may be rotated by a suitable wrench (not shown) clamped to the same and rotated in the direction of arrow 148 (FIG. 9). Rotation of nut 128 on threaded shank portion 115 of bolt 113 while holding bolt 113 allows the tapered end 133 of nut 127 to abut against end 147 of bushing 125 expanding the split bushing radially outwardly expanding the same within hole 124. This provides for complete fill of the hole 124. Such rotation of nut 128 and radial expansion of bushing 125 is carried out until a predetermined torque is reached between nuts 127 and 128 and nut 127 separates from nut 128.

As seen in FIG. 9, at this stage of the assembly, there is a gap between panel 112 and nut 128. Thus, there is of yet no clamp up of the panels 111 and 112. Tapered portions 147, 133 insure proper placement of bushing 125.

Figure 13:
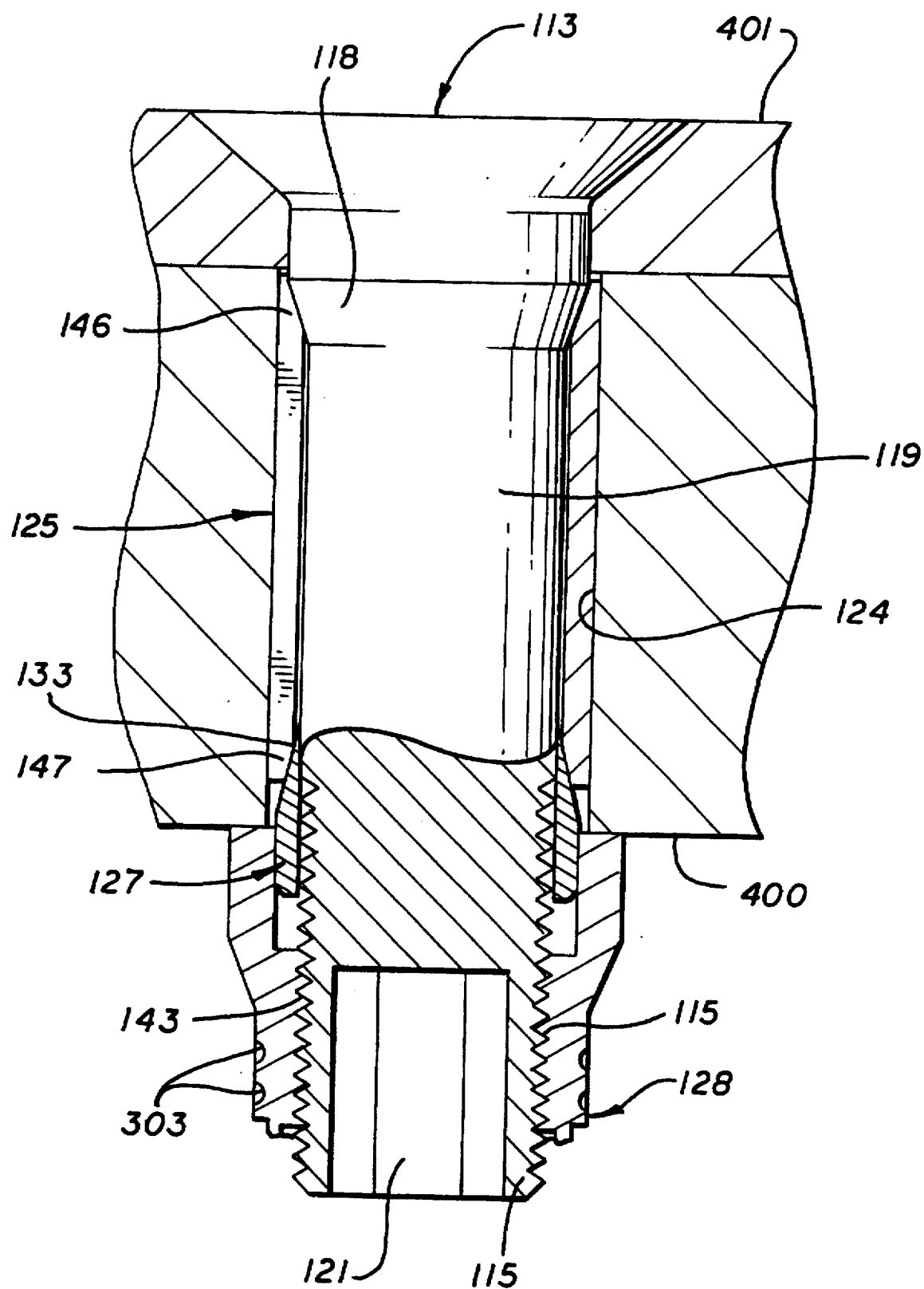
FIG. 13 is the final assembled view of the fastener of FIGS. 7 to 12 to the panels of FIG. 8.

Rotation of second nut 128 is continued until nut portion 134 abuts against panel 112 and a predetermined torque is reached between integral cylindrical portion 137 (FIG. 11) and portion 136. As the nut (128) continues to rotate, it applies an axial clamp-up force onto the panel (112) and panel (111) against the head or underside (117) of the bolt (113). Portions 137, 140 break away from the remainder of nut 128 at break groove 138 as seen in FIG. 13. The cylindrical portion 134 of nut 128 thus abuts against the underside 400 of panel 112 thereby bottoming out against panel 112 as seen in FIG. 13. At this point, nut 128, deformed or distorted in its thread area at threads 143, locks nut 128 in place when nut 128 is properly torqued.

Figure 14:
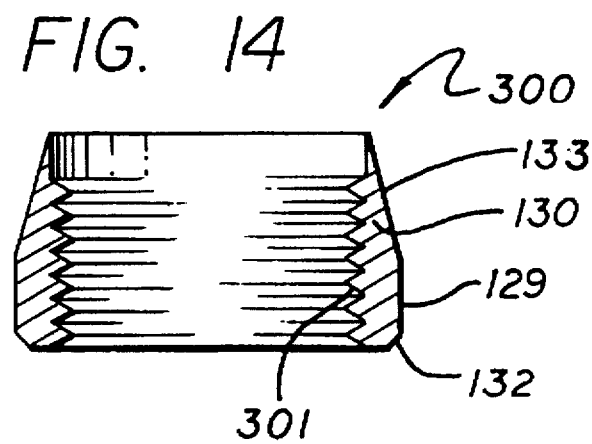
FIG. 14 is a view similar to FIG. 10 showing a modification of the bushing of FIG. 10.
Figure 12:
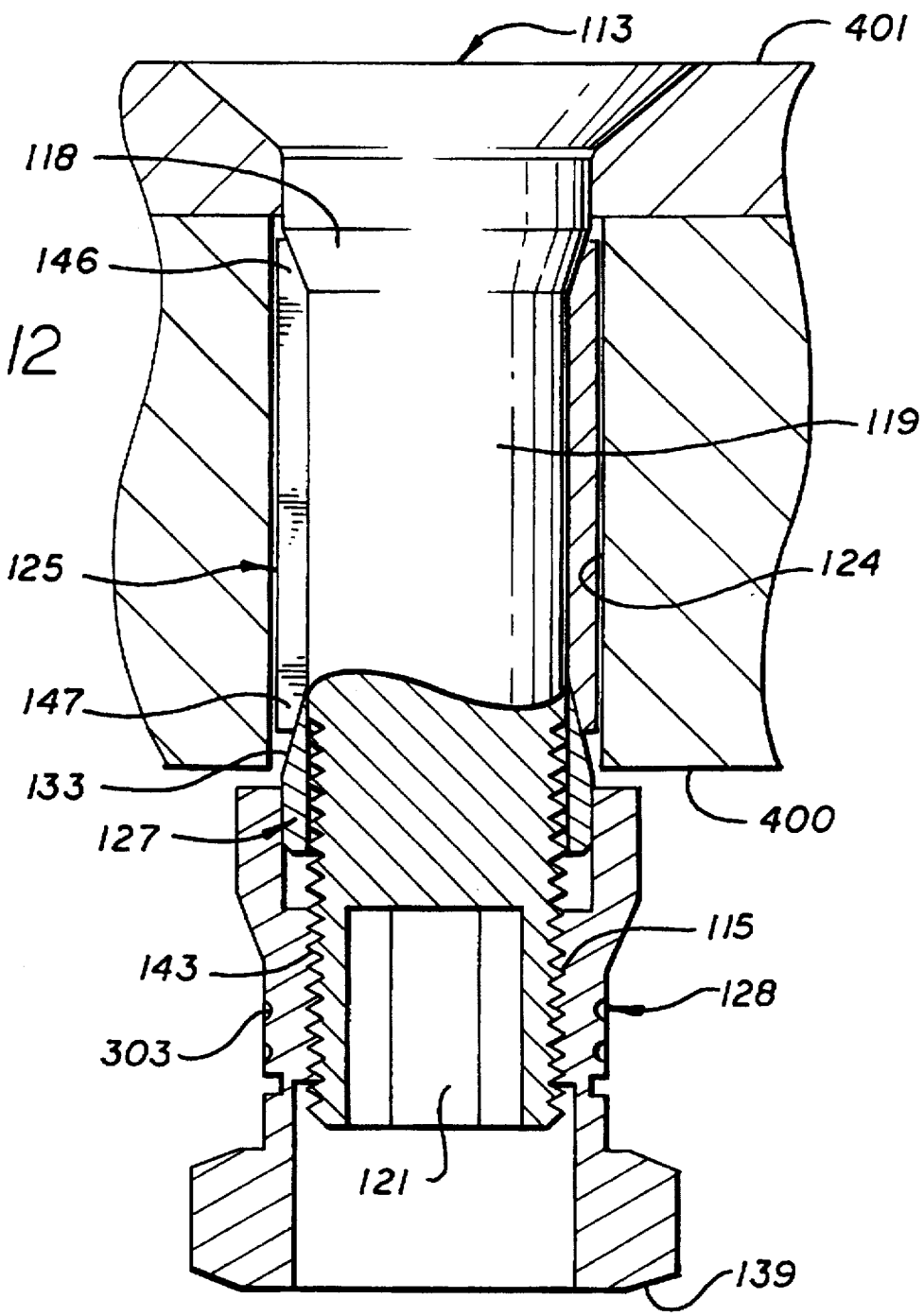
FIG. 12 is an elevational view, partly in section, of the assembly of FIG. 9 prior to tightening of the nuts of the fastener.
Figure 15:
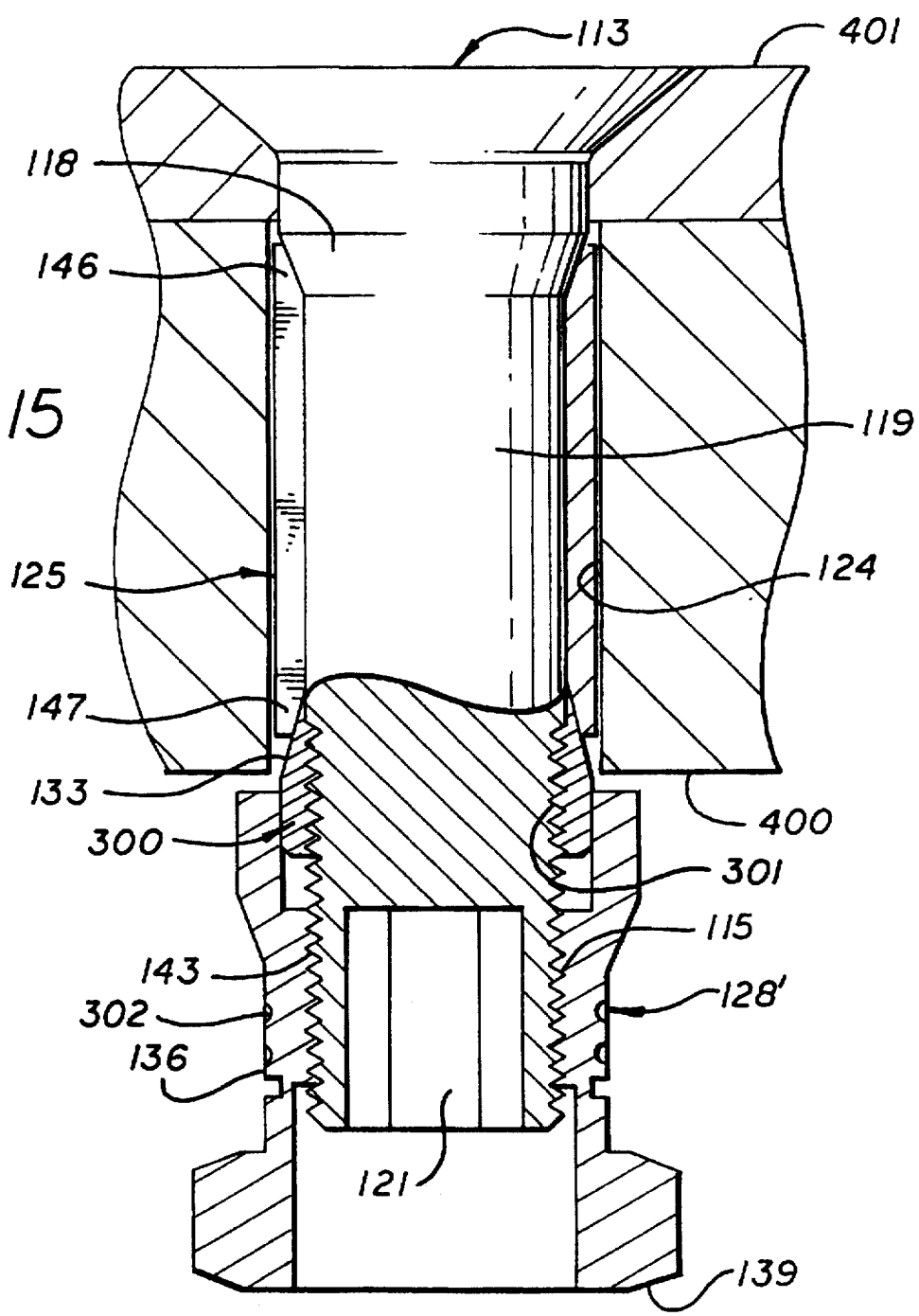
FIG. 15 is a view similar to FIG. 12 showing the assembly of the bushing of FIG. 14.

Although the interior of bushing 127 is shown in FIG. 10 as a cylindrical bore, as seen in FIGS. 14 and 15, wherein like numerals refer to like parts of FIGS. 10 and 12, bushing 300 (FIG. 14) has a threaded throughbore 301. Referring to FIG. 15, threaded throughbore 301 engages the threads of threaded shaft 115. A plurality of small deformations or distortions 302 are provided about body portion 129 as heretofore discussed. The operation of the parts is otherwise identical to the operation of the parts of FIGS. 9 to 12 as heretofore discussed except that the deformations 302 provide a self-locking means with nut 128. This allows nut 300 to remain in correct position once it has been properly set. Such deformations 303 may also be provided on outside on nut 128 as shown in FIG. 11.

Figure 16:
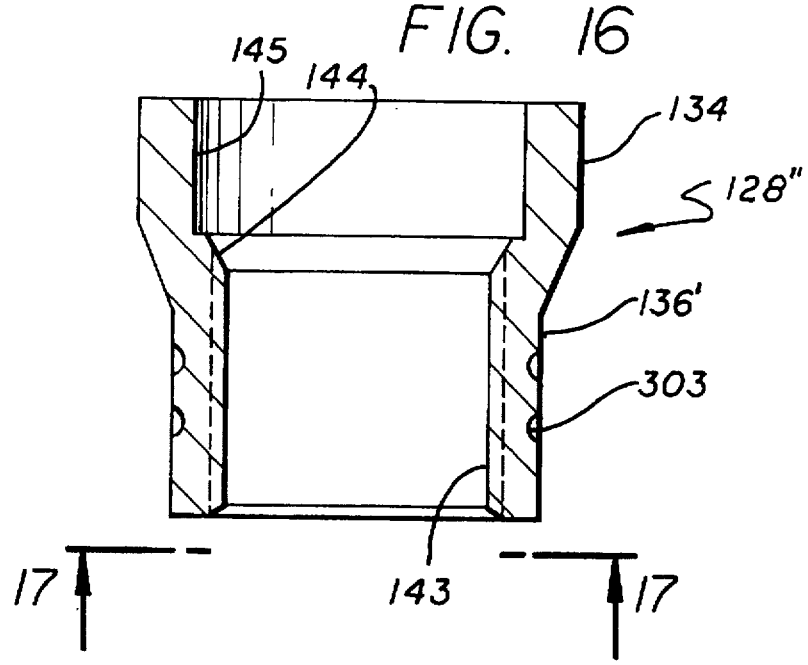
FIG. 16 is a view similar to FIG. 11 showing a modification thereof.
Figure 17:
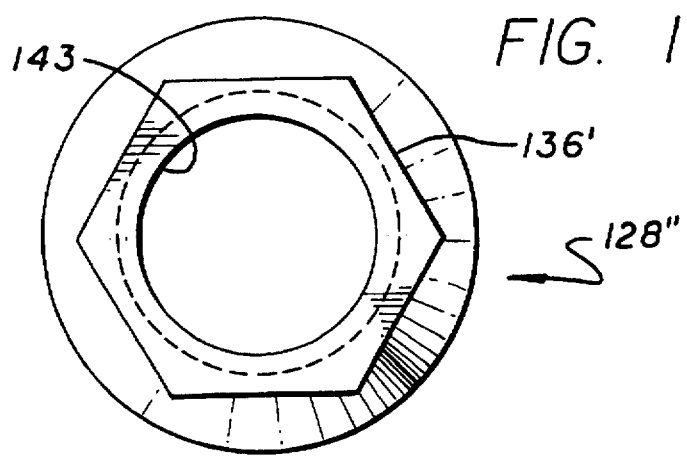
FIG. 17 is a cross-sectional view taken along lines 17—17 of FIG. 16.
Figure 18:
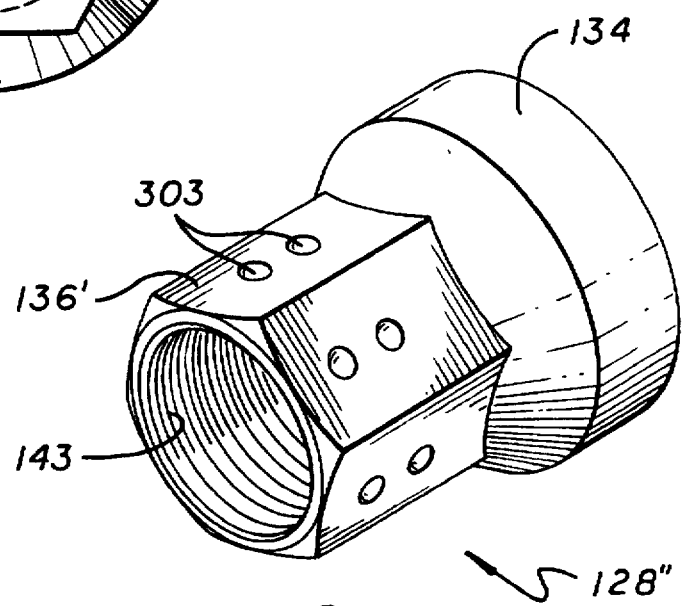
FIG. 18 is a perspective view of the embodiment of FIGS. 16 and 17.

A modification of nut 128 is shown in FIG. 16. Here, nut 128", otherwise identical to nut 128', does not have a breakgroove in portion 136'. This area may be hex-shaped as shown in FIGS. 17 and 18. This hex shape allows the user to rotate the nut and allows the user to have a lightweight part eliminating clean up of a breakaway portion. Nut 128" can thus be installed without need for a breakgroove. A plurality of small distortions or deformations 303 are provided around the exterior of hex portion 136' which create slight distortion of the internal thread 143 thereby creating a self-locking feature when mated with the bolt as heretofore discussed.

Assemblies 10 and 100 thus fill holes 21 and 122, respectively, and compensates for misalignment between holes. The need for cold-working of the holes prior to assembly is eliminated. In cold-working, the holes through the panels are deformed prior to installation of a bolt assembly to render the areas surrounding the holes stronger. The assembly provided herein provides a certain degree of cold-working and may eliminate the need for the same at all in certain applications which cold-working is highly labor intensive. Finally, two aircraft panels are permanently attached together where holes may be misaligned prior to assembly. In the fastener assemblies disclosed herein, the holes are completely filled for better fatigue and shear loads.

Any suitable materials may be used, such as stainless steel and of any suitable dimensions. Although a particular embodiments of the invention have been disclosed, variations thereof may occur to an artisan and the scope of the invention should only be determined by the scope of the appended claims.

I claim:

1. A fastener assembly for permanently securing together a pair of mating panels having aligned apertures therethrough comprising:

a bolt having an enlarged head at one end, a threaded shaft portion at the other end and an integral main body portion interconnecting the head and the shaft portion;

a split ring bushing encircling said integral main body portion of said bolt;

a first nut having a main body portion with a threaded throughbore threadably mounted on said threaded shaft portion of said bolt, said first nut having thread deforming means associated with said nut disposed adjacent the threads of said threaded shaft portion when said first nut is threadably mounted on said threaded shaft portion, said first nut also being threaded on the exterior of the main body portion thereof;

a second nut having a main body portion with a threaded throughbore threadably mounted on said threaded exterior of said first nut, said second nut having thread deforming means associated with said second nut disposed adjacent the threads of said threaded exterior of said first nut when said second nut is threadably mounted on the threaded exterior of said first nut; and cooperating means on said first nut and said bushing for expanding said bushing radially outwardly away from said shaft portion thereby filling the aperture in said panel on which said bushing is disposed when said first nut is threaded on said shaft portion.

2. In the assembly of claim 1 wherein said threaded shaft portion has a socket therein.

3. In the assembly of claim 2 wherein said socket is hex-shaped.

4. In the assembly of claim 1 wherein said enlarged head of said bolt is tapered on the underside thereof.

5. In the assembly of claim 1 wherein said bushing is cylindrical.

6. In the assembly of claim 1 wherein said cooperating means includes said bushing having an inner wall tapered at the end thereof opposite the enlarged head of said bolt.

7. In the assembly of claim 6 wherein said cooperating means further includes said first nut being tapered on the exterior thereof extending toward the enlarged head of said bolt.

8. In the assembly of claim 7 wherein the tapered portion of said bushing mates with the tapered portion of said first nut when said first nut is threaded on said threaded portion of said bolt and abuts against the tapered portion of said bushing.

9. In the assembly of claim 1 wherein each of said thread deforming means includes a plurality of spaced protrusions extending about the ends of said first and second nuts remote from the enlarged head of said bolt, the protrusions of said first nut engaging the threads of the threaded shaft portion of said bolt and the protrusions of said second nut engaging the outer threads of said first nut, each of said protrusions being deformable into their respective threads when a predetermined load is placed thereon.

10. In the assembly of claim 9 wherein said threaded shaft portion has a socket therein.

11. A fastener assembly permanently securing together a pair of mating panels having aligned apertures therethrough wherein one of said panels has a countersunk opening leading into the aperture therein comprising:

a bolt extending through said aligned apertures having an enlarged head at one end disposed in said countersunk opening, a threaded shaft portion at the other end and an integral main body portion interconnecting the head and the shaft portion;

a split ring bushing encircling said integral main body portion of said bolt disposed in the aperture in the other of said panels;

a first nut having a main body portion with a threaded throughbore threadably mounted on said threaded shaft portion of said bolt, said first nut having thread deforming means associated with said nut disposed adjacent the threads of said threaded shaft portion, said first nut also being threaded on the exterior of the main body portion thereof;

a second nut having a main body portion with a threaded throughbore threadably mounted on said threaded exterior of said first nut, said second nut having thread deforming means associated with said second nut disposed adjacent the threads of said threaded exterior of said first nut when said second nut is threadably mounted on the threaded exterior of said first nut; and cooperating means on said first nut and said bushing for expanding said bushing radially outwardly away from said shaft portion thereby filling the aperture in said panel on which said bushing is disposed when said first nut is threaded on said shaft portion.

12. In the assembly of claim 10 wherein said socket is hex-shaped.

13. In the assembly of claim 10 wherein said enlarged head of said bolt is tapered on the underside thereof conforming to the countersunk opening in one of said panels.

14. In the assembly of claim 10 wherein said bushing is cylindrical.

15. In the assembly of claim 10 wherein said bushing has an inner wall tapered at the end thereof opposite the enlarged head of said bolt.

16. In the assembly of claim 13 wherein said cooperating means includes said first nut being tapered on the exterior thereof extending toward the enlarged head of said bolt.

17. In the assembly of claim 14 wherein said cooperating means further includes a tapered portion on the inner wall of said bushing extending toward said first nut whereby said bushing mates with the tapered portion of said first nut when said first nut is threaded on said threaded portion of said bolt and abuts against the tapered portion of said bushing.

18. In the assembly of claim 10 wherein each of said thread deforming means includes a plurality of spaced protrusions extending about the ends of said first and second nuts remote from the enlarged head of said bolt, the protrusions of said first nut engaging the threads of the threaded shaft portion of said bolt and the protrusions of said second nut engaging the outer threads of said first nut, each of said protrusions being deformable into their respective threads when a predetermined load is placed thereon and when said first nut is forced against said bushing when threaded on said bolt and said second nut abuts against an underside of the other of said panels when threaded on said first nut thereby providing a mechanical lock between said deformed protrusions and said mating threads permanently locking said panels together.

19. A fastener assembly for permanently securing together a pair of mating panels having aligned apertures therethrough comprising:

a bolt having an enlarged head at one end, a threaded shaft portion at the other end and an integral main body portion interconnecting the head and the shaft portion;

a split ring bushing encircling said integral main body portion of said bolt;

a first nut having a main body portion with a threaded throughbore threadably mounted on said threaded shaft portion of said bolt;

a second nut having a main body portion and an integral extension portion, said main body portion of said second nut being mounted in the interior of said first nut with said extension portion extending outwardly from said first nut toward said bushing when said main body portion of said second nut is mounted in the interior of said first nut, said second nut being keyed to said first nut for rotation therewith and break away means associated with said first and second nut for breaking away said second nut from said first nut when a predetermined torque is placed thereon; and cooperating means on said first nut and said bushing for expanding said bushing radially outwardly away from said shaft portion thereby filling the aperture in said panel on which said bushing is disposed when said first nut is threaded on said shaft portion.

20. In the assembly of claim 19 wherein said first nut has an irregularly configured main body portion.

21. In the assembly of claim 19 wherein said threaded shaft portion has a socket therein.

22. In the assembly of claim 19 wherein said socket is irregularly configured for receiving a like configured tool therein.

23. In the assembly of claim 19 wherein said enlarged head of said bolt is tapered on the underside thereof.

24. In the assembly of claim 19 wherein said bushing is cylindrical.

25. In the assembly of claim 19 wherein said bushing has an inner wall tapered at the end thereof opposite the enlarged head of said bolt.

26. In the assembly of claim 24 wherein said cooperating means includes said first nut being tapered on the exterior thereof extending toward the enlarged head of said bolt.

27. In the assembly of claim 25 wherein said cooperating means further includes a tapered portion on the inner wall of said bushing extending toward said first nut whereby said bushing mates with the tapered portion of said first nut when said first nut is threaded on said threaded portion of said bolt and said second nut carded thereon abuts against the tapered portion of said bushing.

28. In the assembly of claim 19 wherein said second nut is smooth bored on its interior.

29. In the assembly of claim 19 wherein said second nut is threaded on its interior.

30. In the assembly of claim 19 wherein said first nut has a breakgroove on said main body portion, said breakgroove being adapted to break away when a predetermined torque is placed on said first nut.

31. In the assembly of claim 29 wherein said first nut has an enlarged head with a plurality of flats therein integral with the main body portion of said first nut and remote from the head of said bolt, said breakgroove separating said head of said first nut from the main body portion thereof.

32. In the assembly of claim 31 including thread deforming means associated with said first nut for deforming into the threads of said threaded shaft portion when said predetermined torque is reached on said first nut and said head thereof separates from the main body portion thereof.

33. In the assembly of claim 31 wherein said first nut has an irregularly configured main body portion.

34. A fastener assembly for permanently securing together a pair of mating panels having aligned apertures therethrough wherein one of said panels has a countersunk opening leading into the aperture therein comprising:

a bolt extending through said aligned aperture having an enlarged head at one end disposed in said countersunk opening, a threaded shaft portion at the other end and an integral main body portion interconnecting the head and the shaft portion;

a split ring bushing encircling said integral main body portion of said bolt disposed in the aperture in the other of said panels;

a first nut having a main body portion with a threaded throughbore threadably mounted on said threaded shaft portion of said bolt;

a second nut having a main body portion and an integral extension portion, said main body portion of said second nut being mounted in the interior of said first nut with said extension portion extending outwardly from said first nut toward said bushing when said main body portion of said second nut is mounted in the interior of said first nut, said second nut being keyed to said first nut for rotation therewith and break away means associated with said first and second nut for breaking away said second nut from said first nut when a predetermined torque is placed thereon; and cooperating means on said second nut and said bushing for expanding said bushing radially outwardly away from said shaft portion thereby filling the aperture in said panel on which said bushing is disposed when said second nut is threaded on said shaft portion.

35. In the assembly of claim 33 wherein said first nut has a breakgroove on said main body portion, said breakgroove being adapted to break away when a predetermined torque is placed on said first nut and said first nut abuts against the other of said panels.

36. In the assembly of claim 33 wherein said threaded shaft portion has a socket therein.

37. In the assembly of claim 33 wherein said socket is irregularly configured for receiving a like configured tool therein.

38. In the assembly of claim 33 wherein said enlarged head of said bolt is tapered on the underside thereof.

39. In the assembly of claim 33 wherein said bushing is cylindrical and incorporates self-locking means on the exterior thereof for locking said bushing to said first nut when set.

40. In the assembly of claim 33 wherein said bushing has an inner wall tapered at the end thereof opposite the enlarged head of said bolt.

41. In the assembly of claim 38 wherein said cooperating means includes said second nut being tapered on the exterior thereof extending toward the enlarged head of said bolt.

42. In the assembly of claim 33 wherein said second nut is smooth bored on its interior.

43. In the assembly of claim 33 wherein said second nut is threaded on its interior.

44. In the assembly of claim 39 wherein said cooperating means further includes a tapered portion on the inner wall of said bushing extending toward said second nut whereby said bushing mates with the tapered portion of said second nut when said first nut is threaded on said threaded portion of said bolt and said second nut carried thereon abuts against the tapered portion of said bushing.

45. In the assembly of claim 43 wherein said first nut has an enlarged head with a plurality of flats therein integral with the main body portion of said first nut and remote from the head of said bolt, said breakgroove separating said head of said first nut from the main body portion thereof.

46. In the assembly of claim 45 including thread deforming means associated with said first nut for deforming into the threads of said threaded shaft portion when said predetermined torque is reached on said first nut and said head thereof separates from the main body portion thereof.

\* \* \* \* \*